US012691473B2

(12) United States Patent
Bursac et al.

(10) Patent No.: US 12,691,473 B2
(45) Date of Patent: Jul. 28, 2026

(54) SORTING METHOD FOR AN AUTOMATIC SORTING PROCESS, AND SORTING DEVICE

(71) Applicant: TRUMPF Werkzeugmaschinen SE + Co. KG, Ditzingen (DE)

(72) Inventors: Nikola Bursac, Hamburg (DE); Marc Teschner, Stuttgart (DE); Magnus Deiss, Stuttgart (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 0 days.

(21) Appl. No.: 18/786,703

(22) Filed: Jul. 29, 2024

(65) Prior Publication Data

US 2024/0383010 A1 Nov. 21, 2024

Related U.S. Application Data

(63) Continuation of application No. PCT/EP2023/051182, filed on Jan. 19, 2023.

(30) Foreign Application Priority Data

Feb. 18, 2022 (DE) ..................... 10 2022 103 890.4

(51) Int. Cl.
*B07C 5/36* (2006.01)

(52) U.S. Cl.
CPC ...... *B07C 5/361* (2013.01); *B07C 2501/0063* (2013.01)

(58) Field of Classification Search
CPC ........... B07C 5/342; B07C 5/36; B07C 5/361; B65G 2203/0225; B65G 2203/0233; B65G 47/256
USPC .......................................... 198/395; 209/552
See application file for complete search history.

(56) References Cited

U.S. PATENT DOCUMENTS

| | | | | |
|---|---|---|---|---|
| 6,438,437 | B1 | 8/2002 | Yamaoka et al. | |
| 11,059,076 | B2 | 7/2021 | Bauer et al. | |
| 11,389,950 | B2 | 7/2022 | Röder | |
| 11,953,885 | B2 | 4/2024 | Kiefer et al. | |
| 2017/0232479 | A1 | 8/2017 | Pietzka et al. | |
| 2019/0243343 | A1 | 8/2019 | Kiefer et al. | |
| 2020/0189855 | A1* | 6/2020 | Muehlberger | B65G 43/08 |
| 2021/0308787 | A1 | 10/2021 | Kiefer et al. | |
| 2021/0385413 | A1* | 12/2021 | Wen | G06T 7/001 |

FOREIGN PATENT DOCUMENTS

| | | | |
|---|---|---|---|
| DE | 69924220 | T2 | 11/2005 |
| DE | 102016120131 | A1 | 4/2018 |
| DE | 102016120132 | A1 | 4/2018 |

(Continued)

*Primary Examiner* — Molly K Devine
(74) *Attorney, Agent, or Firm* — LEYDIG, VOIT & MAYER, LTD.

(57) ABSTRACT

A sorting method automatically sorts workpieces arranged in a removal area of a flatbed machine tool, in particular a laser cutting machine or a punching machine, into a deposit area after a sorting process. The method includes: creating at least one actual image that depicts an actual state of the removal area; and analyzing the actual image to identify process disruptions. A measure to adjust the sorting process is automatically initiated upon identifying a process disruption.

16 Claims, 5 Drawing Sheets

(56) References Cited

FOREIGN PATENT DOCUMENTS

| | | | |
|---|---|---|---|
| DE | 102017107357 | A1 | 4/2018 |
| DE | 102018126050 | A1 | 4/2020 |
| DE | 102019115559 | A1 | 12/2020 |
| DE | 102019115634 | B3 | 12/2020 |
| EP | 3514639 | A1 | 7/2019 |
| JP | S59165678 | A | 9/1984 |
| JP | H09208201 | A | 8/1997 |
| JP | H10296577 | A | 11/1998 |
| JP | 2003200115 | A | 7/2003 |
| JP | 2020049437 | A | 4/2020 |
| JP | 2020116717 | A | 8/2020 |
| WO | WO 2020127797 | A1 | 6/2020 |

* cited by examiner

SORTING METHOD FOR AN AUTOMATIC SORTING PROCESS, AND SORTING DEVICE

CROSS REFERENCE TO RELATED APPLICATIONS

This application is a continuation of International Application No. PCT/EP2023/051182 (WO 2023/156120 A1), filed on Jan. 19, 2023, and claims benefit to German Patent Application No. DE 10 2022 103 890.4, filed on Feb. 18, 2022. The aforementioned applications are hereby incorporated by reference herein.

FIELD

The present disclosure relates to a sorting method for automatically sorting workpieces arranged in a removal area of a flatbed machine tool, in particular a laser cutting machine or a punching machine, into a deposit area after a sorting process. The present disclosure also relates to a sorting device.

BACKGROUND

A sorting method and a sorting device may be used following the manufacture of workpieces in a flatbed machine tool, wherein the workpieces are positioned in the removal area of the flatbed machine tool. For example, a manufacturing table of the flatbed machine tool, which is used to support the workpieces during manufacture, is moved into the removal area. During the subsequent sorting of the workpieces, however, process disruptions can occur that impair the intended sorting process or even make it impossible.

Such process disruptions can be caused by displaced and/or overlapping workpieces, for example, which can prevent the workpiece from being picked up by a gripper. Furthermore, especially when using manufacturing tables with so-called support bars, a process disruption can occur in the form of a component tilted between the support bars or contamination of the support bars, for example a manufacturing residue jammed between the support bars.

Such process disruptions are not recognized with conventional sorting methods, which can prolong the sorting of the workpieces due to unsuccessful removal attempts by the gripper. In addition, the gripper and/or the workpieces can be damaged as a result of the process disruption, as a collision can occur between the gripper and the workpiece, for example. The inventors have recognized that has a detrimental effect on the process reliability and process speed of the sorting process. Furthermore, conventional sorting methods require the intervention of a specialist in order to react appropriately to process disruptions. This also has the disadvantage of reducing the degree of automation.

A method for palletizing parts processed in a processing machine is known from EP 3 514 639 A1, in which the parts processed in the processing machine are moved into an unloading area by a gripping device and positioned at a storage location on a storage surface in the unloading area. The storage surface available in the unloading area and the deposit location of the parts are determined by means of a detection device directed towards the unloading area and a data evaluation device.

DE 10 2016 120 131 A1 discloses a method for supporting a manual sorting operation of workpieces arranged on a sorting table by an operator, in which a sorting signal containing information comprising the type, position and/or shape of at least one removed workpiece is generated from a sorting image data set. The absolute position and/or the contour of the parts and/or the sheet position may be determined by analyzing the sorting image data set.

SUMMARY

In an embodiment, the present disclosure provides a sorting method that automatically sorts workpieces arranged in a removal area of a flatbed machine tool, in particular a laser cutting machine or a punching machine, into a deposit area after a sorting process. The method includes: creating at least one actual image that depicts an actual state of the removal area; and analyzing the actual image to identify process disruptions. A measure to adjust the sorting process is automatically initiated upon identifying a process disruption.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
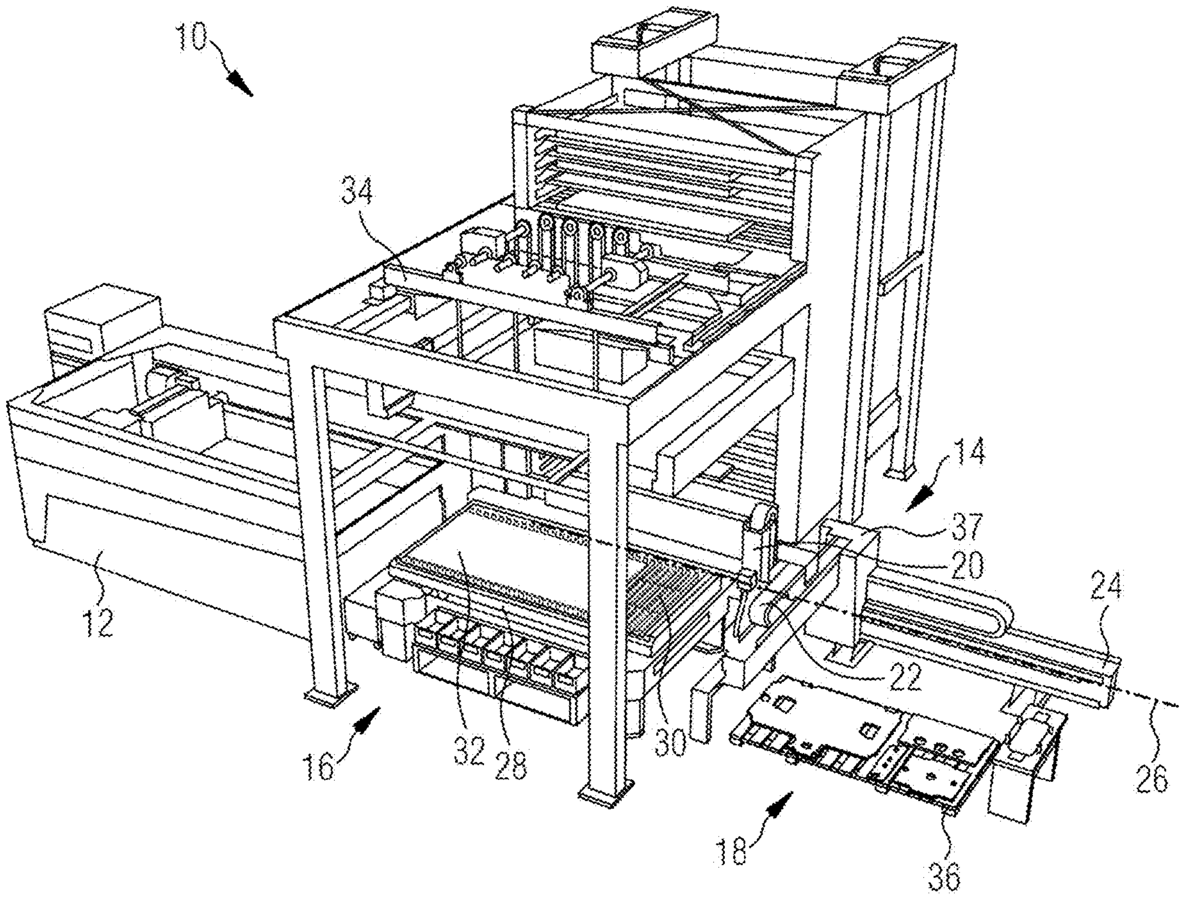
FIG. 1 shows a perspective view of an arrangement with a flatbed machine tool and a sorting device according to an embodiment of the present disclosure.

An aspect of the present disclosure is to increase process reliability, process speed and the degree of automation for automatic sorting.

An aspect of the present disclosure provides a sorting method for automatically sorting workpieces arranged in a removal area of a flatbed machine tool, in particular a laser cutting machine or a punching machine, into a deposit area after a sorting process; characterized by the steps of: creating at least one actual image that depicts the actual state of the removal area; analyzing the actual image to identify process disruptions, wherein a measure to adjust the sorting process is automatically initiated when a process disruption is identified.

The actual image depicts the actual state of the removal area of the flatbed machine tool. In other words, the actual image captures features of the removal area. The actual image is preferably a two-dimensional image of the removal area. For example, the actual image can depict a surface of the removal area that can be captured from a certain imaging angle, wherein the captured features, such as a change in the surface contour, can be depicted in the actual image.

Analyzing the actual image can involve recognizing the features captured in the actual image. Preferably, the features are recognized by means of image processing of the actual image. The features recognized in the actual image can be used to determine predetermined components (in particular workpieces, workpiece support). Preferably, characteristic features of the components to be determined are provided for this purpose. For example, by recognizing a cutting contour, a workpiece with this contour can be determined in the actual image.

According to an aspect of the present disclosure, a process disruption can be identified by analyzing the actual image. Here, it may be provided that properties are determined for the determined components and compared with predetermined reference properties. If a deviation is detected between the determined properties of the determined components and the reference properties, the process disruption is deemed to have been identified. Preferably, the process disruption is not identified until a predetermined degree of deviation is determined.

A process disruption is understood here and in the following as an impairment of the sorting process in which sorting is significantly disrupted or even made impossible. For example, but by no means exhaustively, a process disruption can occur in the form of the events listed below.

"Missing part": In the event of the process disruption "missing part", the workpiece to be removed by the gripper cannot be determined in the removal area. In this case, the gripper attempts to remove the workpiece in vain, which prolongs the sorting of the workpieces.

"Displaced workpiece": This can change the removal position of one or more workpieces, causing the gripper to move to an incorrect position when removing the workpiece. A residual grid can be regarded here and in the following as a workpiece. Furthermore, the workpiece to be removed can overlap another workpiece. Access by the gripper may be unsafe or inadequate in all cases, which can damage the workpieces and/or the gripper.

"Tilted workpiece": A tilted workpiece may be in the correct position for removal but have an orientation that prevents access by the gripper. This can prevent the workpiece from being removed, which prolongs the sorting of the workpieces.

"Contaminated workpiece support": If manufacturing residues remain on and/or in the workpiece support, this prevents the proper positioning of other workpieces to be removed, which also makes sorting more difficult after the sorting process. This is particularly problematic when using workpiece supports with a so-called bar support. Furthermore, a contaminated workpiece support can occur due to wear and/or soiling, which can make it difficult to properly support the workpieces and therefore make sorting more difficult.

"Jammed and/or stuck workpiece": A workpiece that is jammed and/or stuck between other workpieces and/or the workpiece support makes it more difficult for the gripper to remove the workpiece. This can prolong the sorting of the workpieces.

"Welded and/or miscut workpiece": In this case, the workpiece may still be attached to another workpiece after production, in particular the residual grid, in such a way that removal by the gripper is impossible. This can result in damage and/or displacement of the workpieces and damage to the gripper. In any case, the sorting of the workpieces is prolonged.

"Incorrect occupancy of the workpiece support": Incorrect occupancy of the workpiece support by the workpieces prevents the workpieces from being removed after the predetermined sorting process. This can considerably prolong or even prevent the sorting process.

According to an aspect of the present disclosure, the measure for adjusting the sorting process is initiated automatically when a process disruption is identified. There is an automatic response to the process disruption. The measure for adapting the sorting process can consist of bypassing the process disruption, for example by skipping the removal of a faulty part, or of rectifying the process disruption, for example by cleaning the contaminated workpiece support. Exemplary measures can also include changing the removal sequence of the workpieces, a removal attempt with changed access settings and/or issuing an instruction.

Preferably, an instruction relates to changing the occupancy of the workpiece support, reworking missing or incorrectly cut workpieces and/or intervention by a skilled person. This can counteract a process disruption that has its cause outside of the intervention options provided by the sorting process, which can prevent further process disruptions.

The method according to the present disclosure is set up for monitoring the removal area and for identifying existing and/or occurring process disruptions, wherein the sorting method responds automatically when the process disruption is identified. As a result, the process reliability, the process speed and the degree of automation of the sorting process can be increased.

In a preferred embodiment of the sorting process, it is envisaged that the creation of the actual image and the identification of the process disruption, in particular immediately, takes place before and/or after the sorting of one of the workpieces.

By creating the actual image and identifying the process disruption, in particular immediately before the workpiece is removed, a sudden process disruption can be identified, for example. This can further increase process reliability in particular.

By creating the actual image and identifying the process disruption, in particular immediately after removing a workpiece, a process disruption occurring after removal can be identified, for example. It is particularly advantageous if the measure can then be initiated while the workpiece is being deposited. This can further increase the process speed in particular.

The correct removal of the workpiece can be monitored by creating the actual image and identifying the process disruption, in particular immediately before and after removal. In particular, process reliability can be further increased by adapting the removal strategy of the gripper.

In a preferred embodiment of the sorting process, the actual image is created photographically. Preferably, a camera is used to photographically create the actual image. The photographic actual image is preferably converted into an image format that can be analyzed by means of image evaluation. This allows the reliable methods for graphical image analysis to be used cost-effectively for the sorting process.

It is also possible that the actual image is created using sensors. Preferably, a laser scanner is used in this case. A sensor-based creation of the actual image has particular advantages for removal areas where optical blockages, for example in the form of dust and/or objects, prevent the entire removal area from being detected, particularly continuously. A sensory image of the actual state can be created using a surface scan, for example. Preferably, the surface image is then converted into an image format, allowing the actual image to be analyzed using graphical image evaluation.

Another preferred embodiment of the sorting method is one in which at least two actual images are created and the process disruption is identified by analyzing the two actual images. Preferably, the actual images are created using two different imaging devices, for example two cameras, and/or from different directions. This allows the process disruption to be identified redundantly by analyzing both actual images.

In a preferred embodiment of the sorting method, a spatial position and/or a spatial orientation of the workpieces is determined from the actual image and analyzed. In other words, the individual workpieces are identified in the actual image and then each workpiece is assigned a position and/or a spatial orientation. This allows the sorting process to be adapted so that the workpieces can be removed particularly quickly, as the workpieces can be approached by the gripper particularly quickly and reliably.

The position of the workpiece can, for example, be understood as the geometric centre of the workpiece. Preferably, an ideal access position of the gripper can be determined from the position of the workpiece. This makes it particularly easy for the gripper to move to the position of the workpiece.

The orientation of the workpiece can be understood as an orientation with respect to a coordinate system of the removal area. For example, the workpiece can have an inclined and/or rotated orientation in relation to the removal area. In the case of an inclined and/or rotated orientation, as an adaptation of the sorting process, the gripper can be adapted to the orientation of the workpiece, for example, in order to enable removal.

In a preferred further development of the sorting method, the process disruption is identified by a distance determined by comparing the spatial positions of two workpieces in the actual image. In other words, first the positions of the two workpieces and then the distance between the two workpieces are determined. This can be used, for example, to identify a process disruption caused by overlapping of the two workpieces. Preferably, the distance is determined from the actual image by taking into account the contour of the workpieces. This allows the process disruption to be identified more reliably.

Furthermore, a development of the sorting method is preferred, in which a target image is provided which represents the expected state of the removal area and the process disruption is identified from a predetermined deviation of the spatial position of the workpieces between the actual image and the target image and/or from a predetermined deviation of the spatial orientation of the workpieces between the actual image and the target image.

An “expected state” can include, for example, an expected position and/or orientation of the workpieces and/or an expected state of the removal area. In other words, the target image has expected characteristics of the removal area. The target image can be provided, for example, in the form of a production plan of the workpieces of the flatbed machine tool and/or a reference image in which the expected characteristics have been determined. In the latter case, the actual image of a first comparison can be used as a reference image for a subsequent comparison. This is preferably stored automatically.

In a preferred embodiment of the sorting method, the process disruption is identified by comparing a state of a sorted removal area determined from the actual image with a proper state of the sorted removal area determined from the target image.

In a preferred embodiment of the sorting process, the sorting process is adapted by suspending the sorting process, changing a removal sequence of the workpieces, issuing a warning, informing an operator, cleaning the removal area and/or changing a removal strategy by the gripper. In other words, the process disruption is either rectified or bypassed so that automatic sorting can continue. This can increase process reliability and process speed and reduce the need for intervention by a skilled person.

Aspects of the present disclosure provide a sorting device for automatically removing workpieces from a removal area of a flatbed machine tool and depositing the workpieces in a deposit area after a sorting process. Preferably, the sorting device is set up to carry out the sorting process described above.

The sorting device has a controller for controlling a gripper of the sorting device, wherein the gripper is designed to grip the workpieces.

Furthermore, the sorting device has at least one imaging means that is set up to create an actual image of the removal area.

Furthermore, the sorting device has an evaluation unit that is set up to identify a process disruption by analyzing the actual image of the removal area.

According to an aspect of the present disclosure, the control of the sorting device is set up to automatically initiate a measure to adjust the sorting process when a process disruption is identified.

In a preferred embodiment of the sorting device, the at least one imaging means is designed as a camera, a laser scanner and/or a light section sensor. This makes it possible to create a fast and comprehensive image of the removal area, which can be analyzed in a process-friendly manner using an image analysis unit.

A further preferred embodiment of the sorting device is one in which the at least one imaging means is positioned in a stationary manner above the removal area. A corresponding arrangement enables the overall imaging of the removal area from a fixed position with a fixed angle. This favors the analysis of the actual image by the evaluation unit.

Another preferred embodiment of the sorting device is one in which the sorting device has at least two imaging means, wherein at least one of the imaging means is attached to the gripper. A further imaging means enables redundant imaging of the removal area, in particular from a further imaging direction. This means that, for example, if one imaging means is partially blocked, an analysis can be carried out using the actual image of the other imaging means.

In a further aspect of the present disclosure, it may be provided that the at least one imaging means attached to the gripper is set up to create an actual image of the deposit area. Furthermore, it may be provided that a process disruption in the deposit area, for example an overturned deposit stack, is identified by analyzing the actual image of the deposit area. For identification purposes, the actual image of the deposit area can be compared with a provided target image of the deposit area. This can further increase process reliability.

Further features and advantages of the present disclosure can be found the description, the claims and the drawing. According to the present disclosure, the features mentioned above and those still to be further presented can be used in each case individually or together in any desired expedient combinations. The embodiments shown and described should not be understood as an exhaustive enumeration, but rather are of an exemplary character for describing the present disclosure.

FIG. 1 shows an arrangement 10 with a flatbed machine tool 12 in the form of a laser cutting machine, a sorting device 14, a removal area 16 and a depositing area 18. The exemplary sorting device 14 has a gripper 20 which can be moved along an axis 26 between the removal area 16 and the depositing area 18 by means of an arrangement on a cantilever arm 22 via a rail guide 24. Furthermore, the gripper 20 can be moved translationally and rotationally in relation to the cantilever arm 22.

A workpiece support 28 is positioned in the removal area 16. The workpiece support 28 has a bar support 30. A plurality of workpieces 32, which were previously manufactured in the flatbed machine tool 12, are positioned on the workpiece support 28 (for reasons of clarity, only one workpiece 32 is provided with a reference sign). Above the removal area 16, an imaging means 34 of the sorting device 14 in the form of a camera is attached. The imaging means 34 is directed vertically downwards onto the removal area 16 and is set up for imaging the whole of the latter.

A deposit pallet 36 is positioned in the deposit area 18 and is used for depositing and further transporting the workpieces 32.

To sort the workpieces 32, the gripper 20 is moved according to a sorting process stored in a controller 37 of the sorting device 14 until the workpieces 32 have been removed from the removal area 16 and deposited in the deposit area 18. The gripper 20 moves, for example, along the axis 26 over the removal area 16 and is deflected in a vertical direction up to the workpieces 32. The gripper 20 then grips one of the workpieces 32, for example, and is then moved upwards in a vertical direction. The gripper 20 is then moved along the axis 26 into the deposit area 18 and deflected there in the same way in order to deposit the picked-up workpiece 32.

Figure 2:
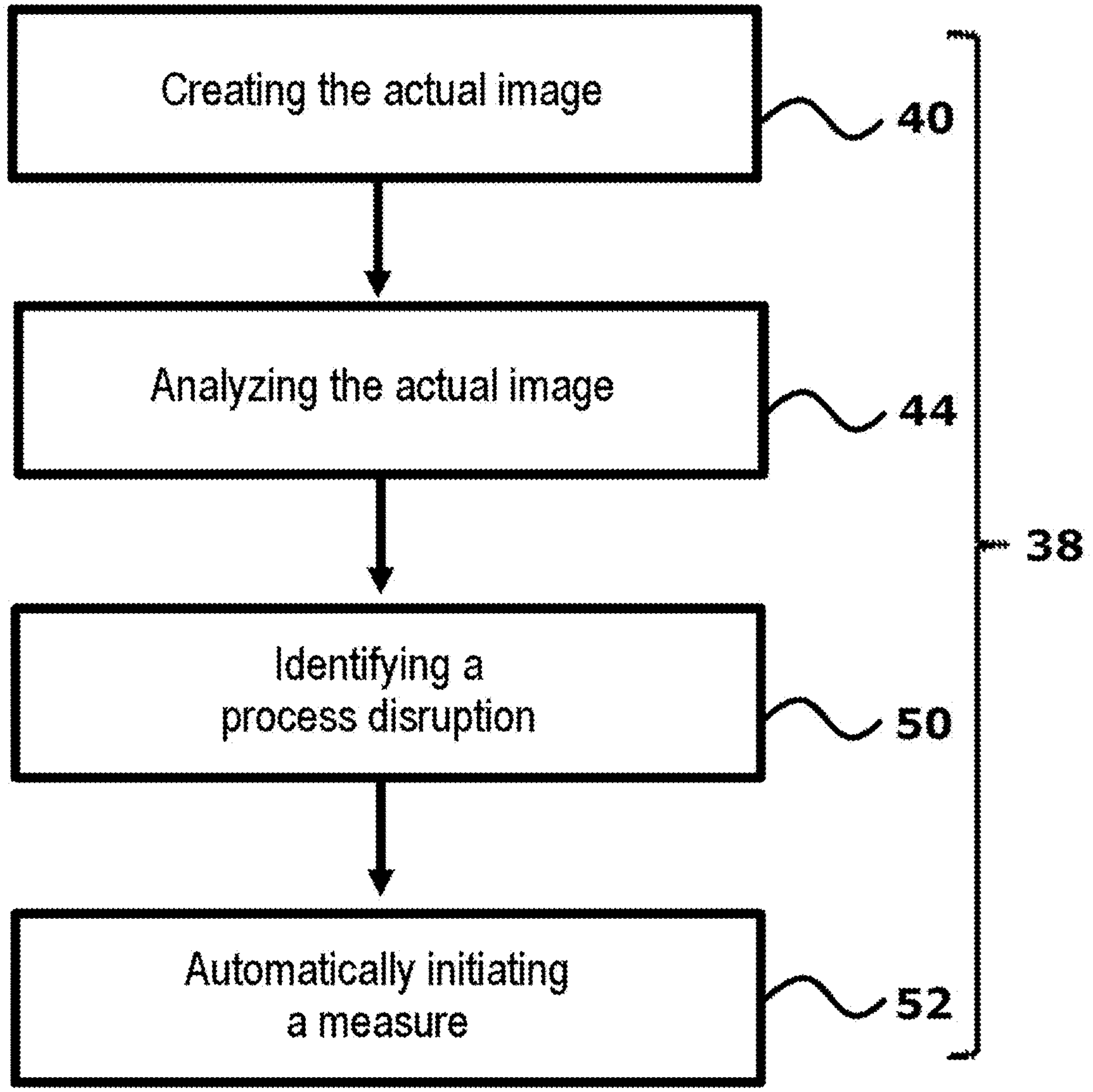
FIG. 2 shows the method according to an embodiment of the present disclosure in a schematic flow chart.

FIG. 2 shows a schematic representation of a sorting method 38 according to the present disclosure, which will be explained by way of example with reference to FIGS. 3 and 4.

In a first method step "creating the actual image" 40, an actual image 42 (see FIG. 3) of the removal area 16 is created. The actual image 42 is created, for example, by the imaging means 34 in the form of a camera (see FIG. 1) and can be in the form of a two-dimensional photograph. The actual image 42 can capture the entire removal area 16 as shown in FIG. 3 and depicts the workpiece support 28 with the bar support 30 and the workpieces 32.

In a subsequent method step "analyzing the actual image" 44, the actual image 42 is analyzed or evaluated. Here, the image areas shown in the actual image 42 are assigned to predetermined components based on their characteristics. Characteristics of the image areas can be, for example, the brightness, the structure and/or the shape.

Figure 3:
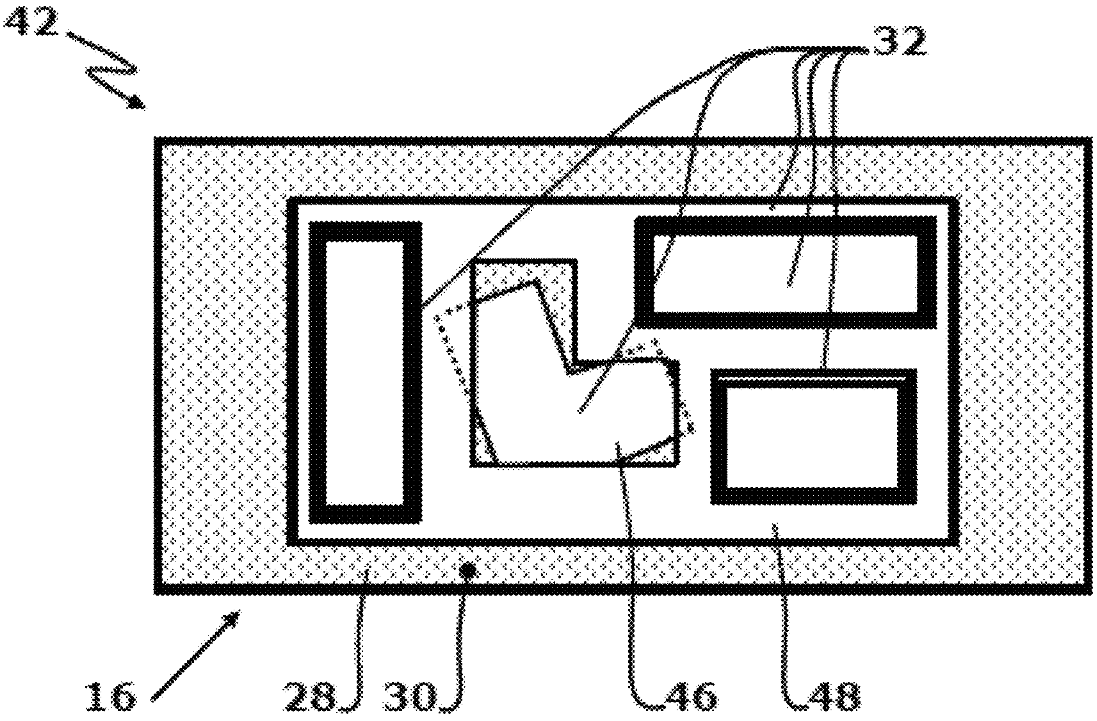
FIG. 3 depicts an image of a removal area with workpieces positioned on a workpiece support with a displaced workpiece in a schematic representation.

For example, the removal area 16 in the actual image 42 according to FIG. 3 can be distinguished from the workpieces 32 by its surface structure. Furthermore, for example, the workpieces 32 can be differentiated from one another by a cut edge that stands out from the image areas of the workpieces 32.

Analyzing also involves determining predetermined properties of the identified components, on the basis of which a process disruption can be identified.

For example, a predetermined property of the determined components can be a minimum distance to another component. According to the actual FIG. 42, all workpieces 32, with the exception of a faulty part 46 and a residual grid 48, have a minimum distance from the respective other workpieces 32. Preferably, on the basis of the properties of the other workpieces 32, it is determined that the residual grid 48 is properly arranged and only the faulty part 46 is out of place relative to the workpieces 32.

In a method step "identifying the process disruption" 50, a deviation of the properties of the components determined in the actual image 42 from predetermined properties can be identified as a process disruption. For example, a process disruption can be identified by the fact that the faulty part 46 does not have the required minimum distance to the residual grid 48.

If a process disruption is identified, a measure to adapt the sorting process is automatically initiated in a method step "automatically initiating a measure" 52. For this purpose, at least one measure to be initiated is stored in the controller 37 of the sorting device 14 for each process disruption that occurs.

For example, the sorting process can be adapted in the case of the faulty part 46 by changing the removal access by the gripper 20. In this case, for example, it can be provided that the faulty part 46 is first rotated by the gripper 20 and then removed. Alternatively or additionally, it may be provided that the faulty part 46 is only removed after the other workpieces 32 have been removed.

Figure 4:
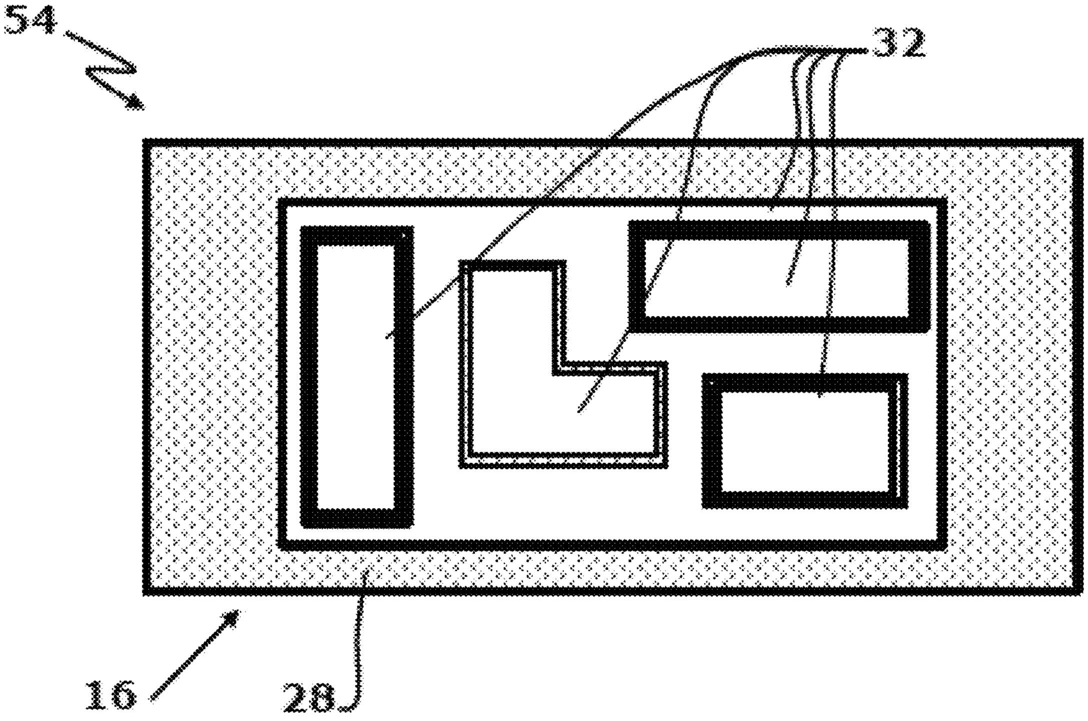
FIG. 4 depicts a target image of the removal area from FIG. 2 with an expected position of the workpieces.

In a preferred embodiment of the sorting method 38, the actual image 42 can be compared with a target image 54 (as shown in FIG. 4) in the method step "analyzing the actual image" 44. The target image 54 preferably represents the same section of the removal area 16 as the actual image 42. The target image 54 represents the expected state of the removal area 16. By comparing the actual image 42 with the target image 54, any deviation in the actual image can be determined in a particularly simple manner by means of image analysis. A process disruption can thus be identified particularly quickly and reliably.

Figure 5:
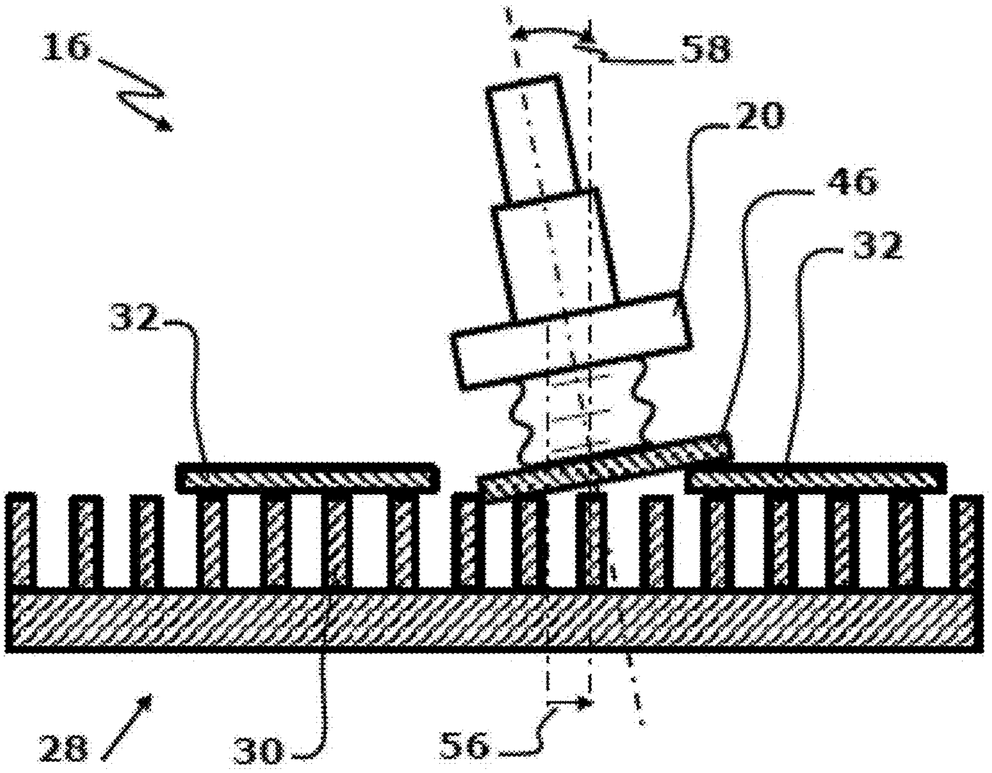
FIG. 5 shows a first removal area after initiating a first measure for adapting a sorting process in a sectional schematic representation.

FIG. 5 shows the removal area 16 after initiating a measure to adjust the sorting process.

According to the exemplary representation in FIG. 5, the removal area 16 contains the faulty part 46, which rests on one of the workpieces 32 on the one hand and on the bar support 30 of the workpiece support 28 on the other hand. The faulty part 46 has a position changed by a translational deflection 56 and an orientation changed by an angle 58, so that the gripper 20 may not be able to grip the faulty part 46 when proceeding according to the originally intended sorting process.

In the method step "analyzing an actual image" 44 (see FIG. 2), the faulty part 46 was determined. In the method step "identifying a process disruption" 50 (see FIG. 2), the process disruption "tilted workpiece" was identified, as the faulty part 46 has a position and orientation that deviates from its expected position and orientation.

To enable removal by the gripper 20, the sorting sequence was automatically changed by adjusting the position and orientation of the gripper to the position and orientation of the faulty part 46.

Figure 6:
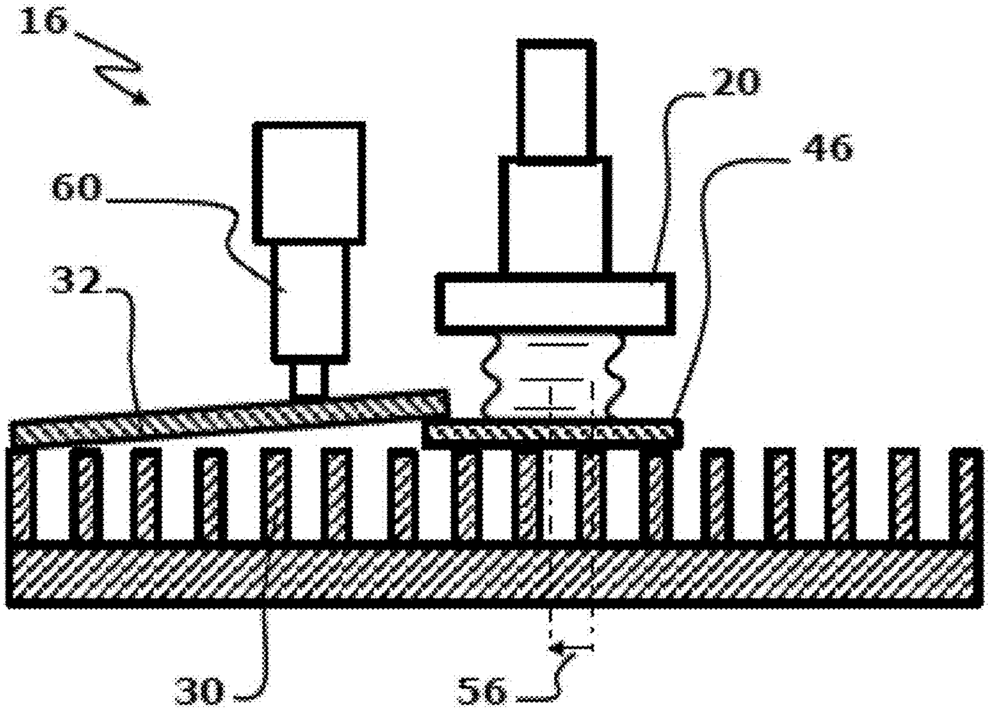
FIG. 6 shows a second removal area after initiating a second measure for adapting the sorting process in a sectional schematic view.

FIG. 6 shows the removal area 16 after initiating a further measure to adjust the sorting process.

According to the exemplary representation in FIG. 6, the removal area 16 contains the faulty part 46, which is arranged on the one hand between the workpiece 32 and the bar support 30 and on the other hand rests on the bar support 30. In other words, the faulty part 46 has slipped under the workpiece 32 by the deflection 56. Removal of the faulty part 46 by the gripper 20 can lead to a considerable displacement of the workpiece 32, as a result of which the workpiece 32 could be damaged or could tilt.

In the method step "analyzing an actual image" 44 (see FIG. 2), the faulty part 46 was determined. In the method step "identifying a process disruption" 50 (see FIG. 2), the process disruption "jammed and/or stuck workpiece" was identified.

In order to prevent the workpiece 32 or other workpieces 32 from being displaced or damaged during removal of the defective part 46 by the gripper 20, the sorting sequence was automatically modified on the one hand by the use of a retaining means 60 and on the other hand by adapting a removal strategy of the gripper 20. While the retaining means 60 applies a retaining force to the workpiece 32 in the vertical direction in order to prevent it from being lifted and displaced, the gripper 20 initially performs a return movement against the deflection 56 after gripping the faulty part 46. This allows the faulty part 46 to be pulled out without displacing the workpieces 32.

Figure 7:
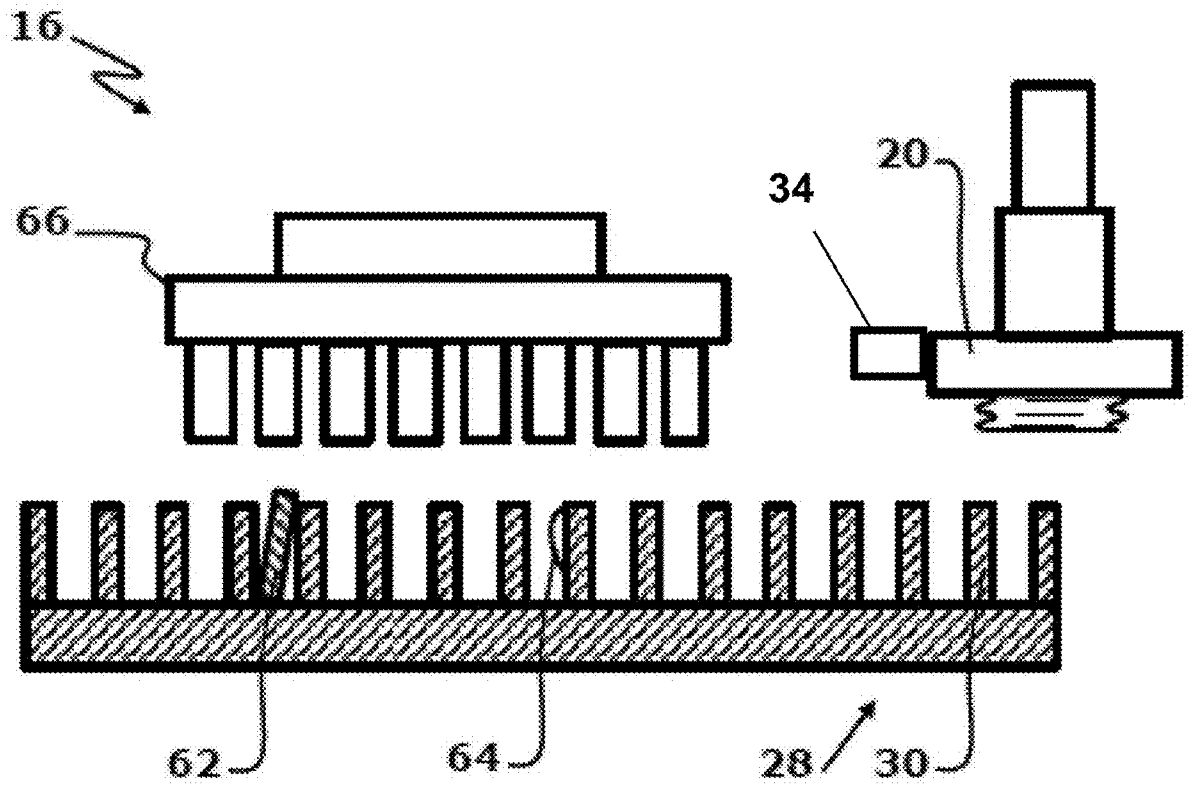
FIG. 7 shows a third removal area after initiating a third measure to adjust the sorting process in a sectional schematic representation.

FIG. 7 shows the removal area 16 in a sorted state without workpieces 32 (see FIGS. 1 to 6) after initiating a third measure to adjust the sorting process.

According to the exemplary representation in FIG. 7, the removal area 16 has a manufacturing residue 62, in particular a slug, and a contamination 64, in particular slag, which are arranged in the bar support 30 and prevent the positioning of workpieces 32 or already negatively influence the production of the workpieces 32 in the flatbed machine tool 12 (see FIG. 1).

In the method step "analyzing an actual image" 44 (see FIG. 2), the manufacturing residue 62 and the contamination 64 were determined. In the method step "identifying a process disruption" 50 (see FIG. 2), for example, the process disruption "contaminated workpiece support" was identified.

In order to enable the workpieces 32 to be properly finished and positioned on the workpiece support 28 and therefore to enable the workpieces 32 to be sorted quickly, the sorting sequence is automatically changed by the use of a cleaning agent 66 in the form of a brush. While the gripper 20 remains in a rest position, the cleaning agent 66 is inserted into the bar support 30 and pulled through it in a horizontal direction. In this way, both the manufacturing residue 62 and the contamination 64 can be effectively removed.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above. The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 arrangement;
12 flatbed machine tool;
14 sorting device;
16 removal area;
18 deposit area;
20 gripper of the sorting device 14;
22 cantilever arm of the sorting device 14;
24 rail guide of the sorting device 14;
26 axis of the rail guide 24;
28 workpiece support;
30 bar support of the workpiece support 28;
32 workpiece;
34 imaging means of the sorting device 14;
36 deposit pallet;
37 controller of the sorting device 14;
38 sorting method;
40 method step "creating an actual image";
42 actual imaging;
44 method step "analyzing the actual image";
46 faulty part;
48 remaining grid;
50 method step "identifying a process disruption";
52 method step "automatically initiating a measure";
54 target image;
56 deflection;
58 angle;
60 retaining means;
62 manufacturing residue;
64 contamination;
66 cleaning agent.

The invention claimed is:

1. A sorting method for automatically sorting workpieces arranged in a removal area of a flatbed machine tool, the flatbed machine tool comprising a laser cutting machine or a punching machine, into a deposit area after a sorting process, the method comprising:

creating at least one actual image that depicts an actual state of the removal area; and analyzing the actual image to identify a process disruption, wherein a measure to adjust the sorting process is automatically initiated upon identifying the process disruption.

2. The sorting method according to claim 1, wherein the creation of the actual image and the identification of the process disruption takes place before and/or after the sorting of one of the workpieces.

3. The sorting method according to claim 1, wherein the actual image is created photographically by a camera, and/or is created by a laser scanner.

4. The sorting method according to claim 1, wherein at least two actual images are created and the process disruption is identified by analyzing the two actual images.

5. The sorting method according to claim 1, wherein a plurality of respective spatial positions and/or a plurality or respective spatial orientations of a plurality of the workpieces are determined from the actual image and analyzed.

6. The sorting method according to claim 5, wherein the process disruption is identified by a distance determined by comparing the spatial positions of two workpieces in the actual image.

7. The sorting method according to claim 5, wherein a target image is provided which represents an expected state of the removal area; and wherein the process disruption is identified from a predetermined deviation of the spatial positions of the workpieces between the actual image and the target image and/or from a predetermined deviation of the spatial orientations of the workpieces between the actual image and the target image.

8. The sorting method according to claim 1, wherein a target image is provided which comprises an expected state of the removal region; and wherein the process disruption is identified by comparing a state of a sorted removal region determined from the actual image with a proper state of the sorted removal region determined from the target image.

9. The sorting method according to claim 1, wherein the sorting process is adapted by suspending the sorting process, changing a removal sequence of the workpieces, issuing a warning, informing an operator, cleaning the removal area, and/or changing access by a gripper.

10. A sorting device for automatically removing workpieces from a removal area of a flatbed machine tool and depositing the workpieces in a depositing area after a sorting process, the sorting device being configured for carrying out the sorting process according to claim 1, the sorting device comprising:

a controller for controlling a gripper of the sorting device, wherein the gripper is designed to grip the workpieces; and at least one imaging device, configured to create an actual image of the removal area;

wherein the controller is configured to automatically initiate a measure for adjusting a sorting sequence of the sorting process based on having identified a process disruption, the process disruption being identified by analyzing the actual image of the removal area.

11. The sorting device according to claim 10, wherein the at least one imaging device is a camera, a laser scanner, and/or a light section sensor.

12. The sorting device according to claim 10, wherein the at least one imaging device is positioned in a stationary manner above the removal area.

13. The sorting device according to claim 10, wherein the sorting device comprises at least two imaging devices, wherein at least one of the imaging device is attached to the gripper.

14. The sorting method according to claim 1, wherein the sorting process is predetermined prior to the analyzing of the actual image, wherein the identified process disruption is an impairment to executing the sorting process, and wherein the measure to adjust the sorting process comprises deviating from the predetermined sorting process.

15. The sorting method according to claim 14, wherein the identified process disruption is a missing part, a displaced workpiece, a tilted workpiece, a contaminated workpiece support, a jammed and/or stuck workpiece, or an incorrect occupancy of the workpiece support.

16. The sorting method according to claim 14, wherein the measure to adjust the sorting process comprises bypassing the process disruption, rectifying the process disruption, changing a removal sequence of the workpieces, changing access setting for a removal attempt, or changing an occupancy of a workpiece support.

* * * * *